(12) United States Patent
Tor et al.

(10) Patent No.: US 8,620,711 B2
(45) Date of Patent: Dec. 31, 2013

(54) INMATE VISITATION SCHEDULING AND MANAGEMENT

(75) Inventors: Daniel K. Tor, Lawrenceville, GA (US);
Christopher L. R. Gickler, Delaware, OH (US); John G. Crites, Albuquerque, NM (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2596 days.

(21) Appl. No.: 10/721,471

(22) Filed: Nov. 26, 2003

(65) Prior Publication Data

US 2005/0114192 A1    May 26, 2005

(51) Int. Cl.
*G06Q 10/00* (2012.01)

(52) U.S. Cl.
USPC ....... 705/7.19; 705/7.15; 705/7.16; 705/7.17; 705/7.18; 379/202.01; 379/202.02; 379/202.03; 379/202.04; 379/202.05

(58) Field of Classification Search
USPC .......... 705/8, 7.11–7.24; 379/202.01–207.01
See application file for complete search history.

(56) References Cited

U.S. PATENT DOCUMENTS

| | | | | |
|---|---|---|---|---|
| 4,360,827 A * | 11/1982 | Braun | 348/14.09 |
| 4,831,552 A * | 5/1989 | Scully et al. | 715/751 |
| 5,748,907 A * | 5/1998 | Crane | 705/2 |
| 5,781,731 A * | 7/1998 | Koreeda et al. | 709/204 |
| 5,852,466 A * | 12/1998 | Komine et al. | 348/14.1 |
| 5,978,363 A * | 11/1999 | Dimitrijevic et al. | 370/319 |
| 6,009,169 A * | 12/1999 | Styron | 379/453 |
| 6,195,117 B1 * | 2/2001 | Miyazaki | 348/14.09 |
| 6,275,251 B1 * | 8/2001 | Hartman et al. | 348/14.01 |
| 6,976,032 B1 * | 12/2005 | Hull et al. | 1/1 |
| 7,046,779 B2 * | 5/2006 | Hesse | 379/202.01 |
| 7,061,521 B2 * | 6/2006 | Bulriss et al. | 348/14.08 |
| 7,085,359 B2 * | 8/2006 | Crites et al. | 379/112.01 |
| 7,256,816 B2 * | 8/2007 | Profanchik et al. | 348/14.09 |
| 7,278,028 B1 * | 10/2007 | Hingoranee | 713/186 |
| 7,333,798 B2 * | 2/2008 | Hodge | 455/411 |
| 7,337,123 B2 * | 2/2008 | Dvorak et al. | 705/7.19 |
| 7,523,385 B2 * | 4/2009 | Nguyen et al. | 715/200 |
| 7,747,459 B2 * | 6/2010 | Doss et al. | 705/7.19 |
| 2002/0099794 A1 * | 7/2002 | Lue Chee Lip et al. | 709/218 |
| 2002/0128894 A1 * | 9/2002 | Farenden | 705/8 |
| 2002/0156672 A1 * | 10/2002 | Burko | 705/9 |
| 2002/0167922 A1 * | 11/2002 | Inoue et al. | 370/331 |
| 2003/0058082 A1 * | 3/2003 | Mallick et al. | 340/5.6 |
| 2003/0167193 A1 * | 9/2003 | Jones et al. | 705/7 |
| 2003/0208391 A1 * | 11/2003 | Dvorak et al. | 705/8 |
| 2004/0093290 A1 * | 5/2004 | Doss et al. | 705/35 |
| 2004/0102992 A1 * | 5/2004 | Tapsell et al. | 705/1 |
| 2004/0236601 A1 * | 11/2004 | Summers et al. | 705/2 |
| 2004/0243435 A1 * | 12/2004 | Williams | 705/2 |

OTHER PUBLICATIONS

Staff Reporter, The Hindu. "Telgi Case: Two Jail Officials Arrested". Dec. 11, 2003, p. 1.*

(Continued)

*Primary Examiner* — Alan S Miller

(57) ABSTRACT

A computerized visitation registration and scheduling system provides the department of corrections the ability to have inmates and visitors schedule visits through an automated interface, such as a telephone interface, or the internet. The system allows, for example, the ability for potential visitors to perform a registration process with little to no manual overhead requirements of department of corrections employees. Secondly, potential visitors, once approved, are able to schedule inmate visits without necessarily having to burden department of corrections employees.

20 Claims, 11 Drawing Sheets

(56) References Cited

OTHER PUBLICATIONS

Orange County Register, Santa Ana, California. "Limiting Prison Visits." 1st Edition, Apr. 4, 2002.*
"TOSS Video Network Management, Inc. Announces New Product TC Reliance Video Visitation Manager 1.0", Press Release, Apr. 23, 2003, http://www.toddvnm.com/pr/042320032.htm.
"Conversational Voice-Access Solutions that Attract and Retain Customers: Correction Facilities", Web for Phone, http://www.webforphone.com/uses/corrections.asp.
"Application Examples", WG Systems, copyright 2001-2003 http://www.wgsystems.com.br/english/dc/wg_applic_exemp.htm#Corrections.
"Networked Multimedia Communication, Telejustice and Security Solutions", Vugate, http://www.vugate.com/index2.htm.
"Quality Turnkey Solutions from Experienced Telecommunication Professionals for All Your Video, Data, Voice, Security, Networking and Wireless LAN, MAN and WAN Applications", Telecom Engineering Consultants, copyright 2002, http://www.tec-inc.com/.
"IVVIS", TEM Systems, Inc., copyright 2003, http://www.temsystems.com/inmate.htm.
"Video Visitation Voice Scheduling", TEM Systems, Inc., http://www.temsystems.com/inmate%20voice%20scheduling.htm.

* cited by examiner

| | |
|---|---|
| Inmate ID: | 1111111 |
| Registrant Phone: (999-999-9999) | 916-555-3434 |
| Relationship: | Attorney |
| Date of Birth: (mm/dd/yyyy) | 02/24/1944 |
| Legal Guardian: (If below 18) | joseph alade |
| First Name: | william |
| Middle Initial: | k |
| Last Name: | wright |
| Name Suffix: | jr |
| Gender: | ● M ○ F |
| Street Address: | 300 loop circle #33 |
| City: | lawrenceville |
| State: | CA |
| Zip Code: | 95841 |
| Social Security No: (no dashes) | 123223333 |

Submit

Copyright ©2003 Worldcom, Inc.

FIG. 4

INMATE VISITATION SCHEDULING AND MANAGEMENT

BACKGROUND OF THE INVENTION

1. Field of the Invention

An exemplary embodiment of the present invention relates in general to a scheduling and visitation approval system and method. In particular, an exemplary embodiment of the present invention relates to a scheduling and visitation management system that can be used for inmates housed in a department of corrections facility.

2. Background

In recent years, many correctional facilities have extended liberal visitation privileges to inmates to promote community and family ties that contribute positively to an inmate's personal development. In the interest of promoting wholesome family ties, hundreds of visits are permitted to be made each day to inmates of correctional facilities.

Typically, the activities relating to scheduling and coordination of a visit is done in the traditional way by scheduling visitations on a paper calendar.

SUMMARY OF THE INVENTION

An inmate visitation system, comprising means for receiving a visitation request from an inmate, means for sending a registration request based upon the received visitation request, means for receiving registration information based upon the sent registration request; means for determining whether the visitation request from the inmate is approved or disapproved; and means for communicating the approval or disapproval of the visitation request.

A method for registering potential visitors of inmates, comprising: receiving a visitation request from an inmate, sending a registration request based upon the received visitation request; receiving registration information based upon the sent registration request; determining whether the visitation request from the inmate is approved or disapproved; and communicating the approval or disapproval of the visitation request.

An inmate visitation system, comprising: a visitation registration module for receiving a visitation request from an inmate, automatically approving or disapproving a registration request based upon the visitation request and recording information associated with at least one of the visitation request and the registration request; and a visitation scheduling module for scheduling, for approved visitors, an available time to visit an inmate.

BRIEF DESCRIPTION OF THE DRAWINGS

The above and other aspects, features and advantages of this invention will be described in relation to the following figures in which like reference characters refer to the same parts throughout the different views.

FIGS. 2-8 are exemplary inmate visitation system interfaces encountered from a user's perspective;

DETAILED DESCRIPTION

An exemplary embodiment of the present invention relates to registration, approval and scheduling of inmate visitors at, for example, a department of corrections facility. Although specific embodiments will be illustrated and described herein, it should be appreciated by those of ordinary skill in the art that any arrangement, which is calculated to achieve the same purpose, may be substituted for the specific embodiment shown herein. This application is intended to cover any adaptations or variations of the present invention that generally relate to systems, methods and an apparatus for registering, approving, and coordinating inmate visitation requests.

The inmate visitation technology according to an exemplary embodiment of this invention at least provides a computerized visitation registration and scheduling system that provides the department of corrections the ability to have inmates and visitors schedule visits through an automated interface, such as a telephone interface, or the internet. The system allows, for example, the ability for potential visitors to perform a registration process with little to no manual overhead requirements of department of corrections employees. Secondly, potential visitors, once approved, are able to schedule inmate visits without necessarily having to physically contact department of corrections employees.

In the following detailed description of the exemplary embodiments, reference is made to the accompanying drawings that form part hereof, and in which is shown by way of illustration, specific exemplary embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit and scope of the present invention. The following detail description is therefore not to be taken in a limiting sense.

Figure 1:
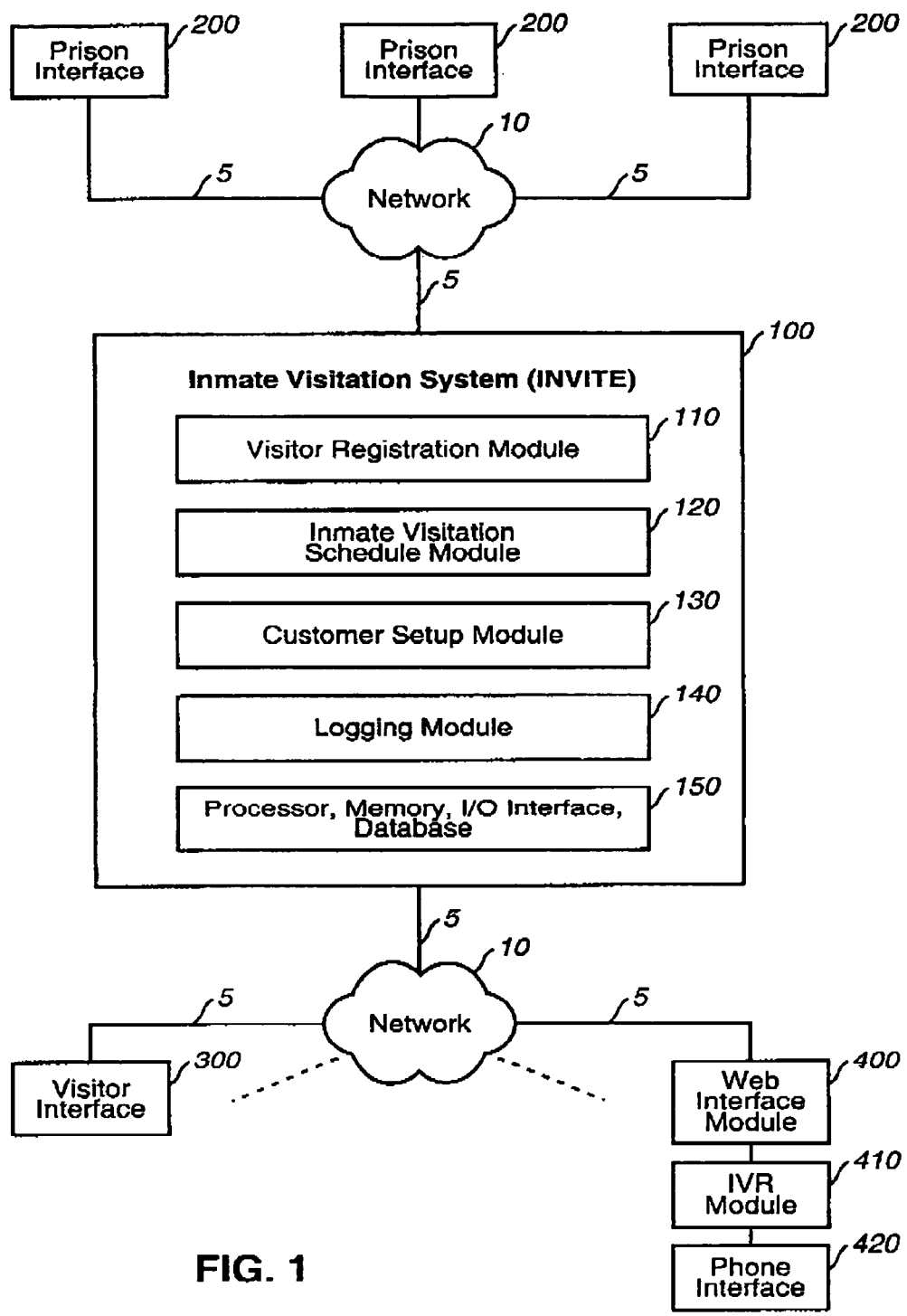
FIG. 1 is a functional block diagram illustrating an exemplary inmate visitation system and accompanying components.

FIG. 1 illustrates an exemplary inmate visitation (INVITE) system 100 and related components. In particular, the inmate visitation system 100 comprises a visitor registration module 110, and inmate visitation schedule module 120, a customer setup module 130, a logging module 140 and a processor, memory, I/O interface and database 150. The inmate visitation system 100 is connected to one or more networks 10, via links 5, to one or more prison interfaces 200, one or more visitor interfaces 300 and/or a web interface module 400. The web interface module 400 is in turn connected to an interactive voice response (IVR) module 410 that is capable of receiving calls from one or more phone interfaces 420.

While the exemplary embodiments illustrated herein show the various components collocated, it is to be appreciated that the various components can be located at distant portions of a distributed network, such as a local area network, a wide area network, a telecommunications network, a dedicated network, an intranet and/or the internet, or within a dedicated secure or unsecured system. Thus, it should be appreciated, that the various components can be combined into one or more devices or collocated on a particular node of a distributed network, such as a telecommunications network. As will be appreciated from the following description, and for reasons of computation efficiency, the components could be arranged at any location within a distributed network without affecting the operation of the system.

Furthermore, it should be appreciated that the various links connecting the elements can be wired or wireless links or any combination thereof, or any other known or later developed element(s) that is capable of supplying and/or communicating data to and from the connected elements.

Additionally, it should be appreciated that while various functional components are illustrated, various other components, such as switches, routers, long distance carriers, firewalls, security components and/or software, or the like, can also be included without affecting the operation of the system.

Furthermore, while the systems and methods of this invention will be described in relation to a specific embodiment, it is to be appreciated that the system can be applied with equal success to other types of communication standards and protocols such as voice-over-packet, voice-over-ip (VoIP), voice-over-network, wired or wireless communication systems, such as mobile phone communications, PDA communications, or the like. In general, the systems and methods of this invention will work equally well with any communications system or protocol.

Furthermore, while the exemplary embodiments will be described in relation to inmates at a department of corrections facility, in general the systems and methods of this invention can be used with any demographic in any environment to schedule visits.

Additionally, the term module as used herein can be any device, software or combination of hardware and software configured to perform at least the particular function associated therewith.

In operation, the customer setup module 130, in cooperation with the processor, memory, I/O interface and database 150, via, for example, input from the prison interface 200, receives and maintains data regarding one or more inmates. This data can include an inmate identification number, inmate visitation privilege information, inmate location information, or in general any other information that may be appropriate for facilitating visitation.

Once established, the invite system 100 automatically and dynamically manages, tracks and schedules visitation to inmates. In general, one or more web interfaces are provided that contain logic capable of updating the database 150 which maintains system, registration and scheduling information. The invite system 100 cooperates with a public interface, such as visitor interface 300 or phone interface 420 and one or more restricted interfaces, such as prison interfaces 200, that allow the registration, approval and scheduling of visits to inmates.

Specifically, an inmate, via a prison interface 200, requests visitation privileges. While the inmate could enter this information directly via the prison interface, which can be, for example, either voice or graphical user interface driven, it should be appreciated than an inmate can cooperate with, for example, a department of corrections official to assist in navigating and entering visitation request information. In particular, the prison interface 200, in cooperation with the processor memory, I/O interface and database 150, communicates with the visitor registration module 110 which receives the basic data for the potential visitor. This basic data for the one or more potential visitors can generally include the phone number of the visitor, the inmate's identification, the relationship of the potential visitor to the inmate, the potential visitors first name, the potential visitors middle name, the potential visitors last name, the potential visitor name suffix, if any, or any other information as appropriate. Thus, the visitor registration module 110 can cooperate with the database 150 to maintain a list of potential visitors for one or more inmates.

Thus, the inmate need not re-enter visitor information upon every request for a visit, but merely pull up an "address book" of potential visitors that is stored, for example, on their behalf.

Upon receiving the visitation request, a visitor registration module 110 contacts the potential visitor and informs the potential visitor of the visitation request and provides instructions on how to register. For example, the visitor registration module 110 can place an automated call to the potential visitor, can generate an e-mail which can be sent to the potential visitor, can automatically print a letter addressed to the potential visitor, or any other known or later developed methodology used for communicating to the potential visitor that they have been identified by a inmate as a potential visitor and requested to register for a visit.

In addition to manually entering potential visitor information, the system can also maintain, in conjunction with the visitor data, a visitation request number that is a system derived inmate request number. This number can be automatically generated by the visitor registration module 110 upon the inmate requesting visitation privileges.

While in accordance with this particular exemplary embodiment, an inmate or department of corrections official enters potential visitation information, it should be appreciated that, for example, a dedicated interface can be provided on the prison interface 200. This dedicated interface could prompt one or more of a department of corrections official or an inmate for the necessary information for a potential visitor. Furthermore, it should be appreciated that this interface could be dynamic insuring the various fields are populated with expected information.

In addition, the visitor registration module 110, in cooperation with the logging module 140, can maintain a history of when the various potential visitors were entered into the system, who performed the data entry, the time of the data entry, or similar information. Furthermore, the visitor registration module 110 can perform a check for eliminating duplicate information or allowing one or more of an inmate or department of corrections official to update one or more potential visitors' information in an inmate's "address book."

Upon receiving registration instructions, the potential visitor contacts the invite system 100, and in particular, the visitor registration module 110, via the visitor interface 300 or the phone interface 420. The visitor interface 300 can be, for example, a web interface, or the like, where the user is presented with one or more graphical interfaces that step them through the visitor registration process. Alternatively, the potential visitor can be given a phone number which, places the user, via the phone interface 420, in communication with an interactive voice response (IVR) module 410. The IVR module 410 queries the user for the information necessary to complete the registration process and cooperates with the web interface module 400 to translate this information into a format compatible with the visitor registration module 110.

Upon receiving the visitor registration information, the visitor registration module 110 assembles the visitor registration information and performs one or more of an automated analysis or provides the specifics regarding the visitor registration and/or historical information to, for example, a department of corrections official. This information can be analyzed to, for example, determine how many times a visitor has visited this particular inmate, the dates of those visits, or any other information that may be relevant in determining whether the potential visitor should be granted visitation access to the inmate. This visitor registration information, along with all other information used by the visitation system, can be used and shared, for example, throughout one or more interconnected visitation systems and can be accessed by and edited by, for example, authorized entities.

Likewise, the approval process need not be automated, but could be simply an information report that is provided to a department of corrections official that has the ability to approve or deny the visitors registration.

In general, only with this registration complete is the visitor allowed access to the particular inmate. Thus, if the registration is denied, a denial notification is sent to the visitor. This denial notification can be sent in an manner similar to the registration request or can be, for example, sent in a manner specified by the visitor during the registration process. Alternatively, if supplemental information is needed before a determination is made as to whether the registration is approved, the registration can be placed on hold and information queries sent to the potential visitor. If the supplemental information does not satisfy the requirements for an approved registration, a denial notification is sent to the visitor. Otherwise, the registration is granted and an approval notification is supplied to the visitor as discussed above.

Once the visitor has registered with the visitor registration module 110, and a visitation request has been approved, in conjunction with the visitation approval communication, the visitor is provided with information on how to access the inmate visitation schedule module 120. The inmate visitation schedule module 120, acts as a calendar that, upon the visitor logging in, allows a proposed visitation date to be entered. If the inmate is available on this date, the visitor is able to select a particular time slot for that date. As with the visitor registration module 110, the inmate visitation schedule 120 can provide an interface, for example, on visitor interface 300, in which the visitor selects date and time information. Alternatively, the visitor can enter this information via a voice based system, such as the interactive voice response module 410 and phone interface 420.

Upon selection of a particular time slot, the visitor supplies registration information for all visitors that will be accompanying the registered visitor. This information can be validated by the inmate visitation schedule module 120, in cooperation with the visitor registration module 110 and, for example, further based on manual intervention by a department of corrections official. If all visitors are allowed to attend the visitation, the inmate visitation schedule module 120 provides a schedule and confirmation to the visitor. This schedule and confirmation can be provided verbally, for example, via the IVR module 410 and phone interface 420. Alternatively, the visitor(s) can be provided with, for example, a printable "ticket" that can be, for example, printed by the visitor interface 300. The ticket can include information, such as, a confirmation number, the list of approved visitors, and, for example, identification information that needs to be brought by each visitor. In addition, the "ticket" could also contain one or more machine readable portions, such as a bar code, or the like, that can, for example, facilitate check-in upon the visitor(s) arriving at the prison. For example, the visitor(s) can present this "ticket" to a scanning machine that communicates with inmate visitation schedule module 120 to provide a department of corrections official at the visitor check-in with a list of visitor(s) and information associated therewith to, for example, help prevent fraudulent tickets and provide real-time visitor/inmate status information.

Furthermore, upon providing this information to the department of corrections official, the inmate visitation schedule module 120 could also check the database 150 to ensure status information regarding the one or more visitor(s) is still valid. In particular, the inmate visitation schedule module 120 could check one or more of the database 150 and logging module 140 to determine if one or more of the visitors on the "ticket" was the basis of a registration denial for another inmate. If this is the case, upon presentment of the "ticket" to the inmate visitation system 100 at the prison, a department of corrections official could be alerted that the status of one or more of the visitors has changed.

For example, upon presentment of the "ticket" to the invite system 100, the inmate visitation schedule module 120 could check the status of the one or more visitors. The status can be, for example, any of the following:

Approve registration
Denied registration
Registration placed on hold pending additional information
Registration expired
Temporarily approved registration (Expires after X days)
Suspended visitation privileges
Inactive registration (visitor will have to re-register)
Restored visitation privileges
Registration approval notification sent
Registration denial notification sent
Changed visitor's profile
First time visit refused
Visitor failed first time visit interview.

If only a portion of the visitors are allowed, the visitor has the option of excluding the non-accepted visitors and accepting a confirmation number for the remaining visitors to visit the prison. Alternatively, the visitor can cancel the visitation request entirely.

As discussed above, when the visitor arrives at the prison, the visitor presents the confirmation number to one or more of a department of corrections official or to, for example, a ticket reader as discussed above. The inmate visitation schedule module 120, having the registration information, confirms the time and date of the scheduled visit and presents the department of corrections official, for example, on prison interface 200, with information regarding whether any of the visitors are first time visitors. If the visitors are first time visitors, the visitor is interviewed and the department of corrections official enters, via user interface 200, whether or not the visitor is approved for visiting the inmate. Based on the results of the interview, the inmate visitation schedule module 120, in cooperation with the input received from the prison interface 200, updates the system to indicate that visitation rights have been granted and the visitor is allowed to visit the inmate, or alternatively the inmate visitation schedule module 120 updates the visitor information stored in database 150 with denial data. This denial data can include, for example, reasons for why the visitation request was denied. The status of the visitor is then updated to indicate that the visitation privileges have been suspended for one or more of a predetermined or indefinite amount of time. Furthermore, a user, such as a department of corrections official at prison interface 200, can indicate whether the suspension should be reconsidered at a latter date. If a suspension reconsideration is not granted, the inmate visitation schedule module 120 indicates that the registration for that visitor is inactivated and sends notice of the same to the visitor. As discussed above, this notice can be sent electronically, via a letter in the mail, and/or by a phone call made to the visitor.

However, in the event the suspension is reconsidered, the inmate visitation schedule module 120 either sends the visitor a rescheduling request at which time the visitor reenters the visitor data as discussed above or flags the visitor as still having a suspension which may or may not include the option of reconsideration. Of course, it should be appreciated that while the various systems above proactively contact the visitor, a "status" interface could be provided where a visitor calls in or navigates to a specific web site to query the current status of their registration.

FIGS. 2-8 illustrate various interfaces that a user, such as a potential visitor, visitor, or department of corrections official may encounter in conjunction with the invite system 100. In particular, the following figures follow the exemplary functional flow outlined above for the registration, scheduling and check-in processes.

Figure 2:
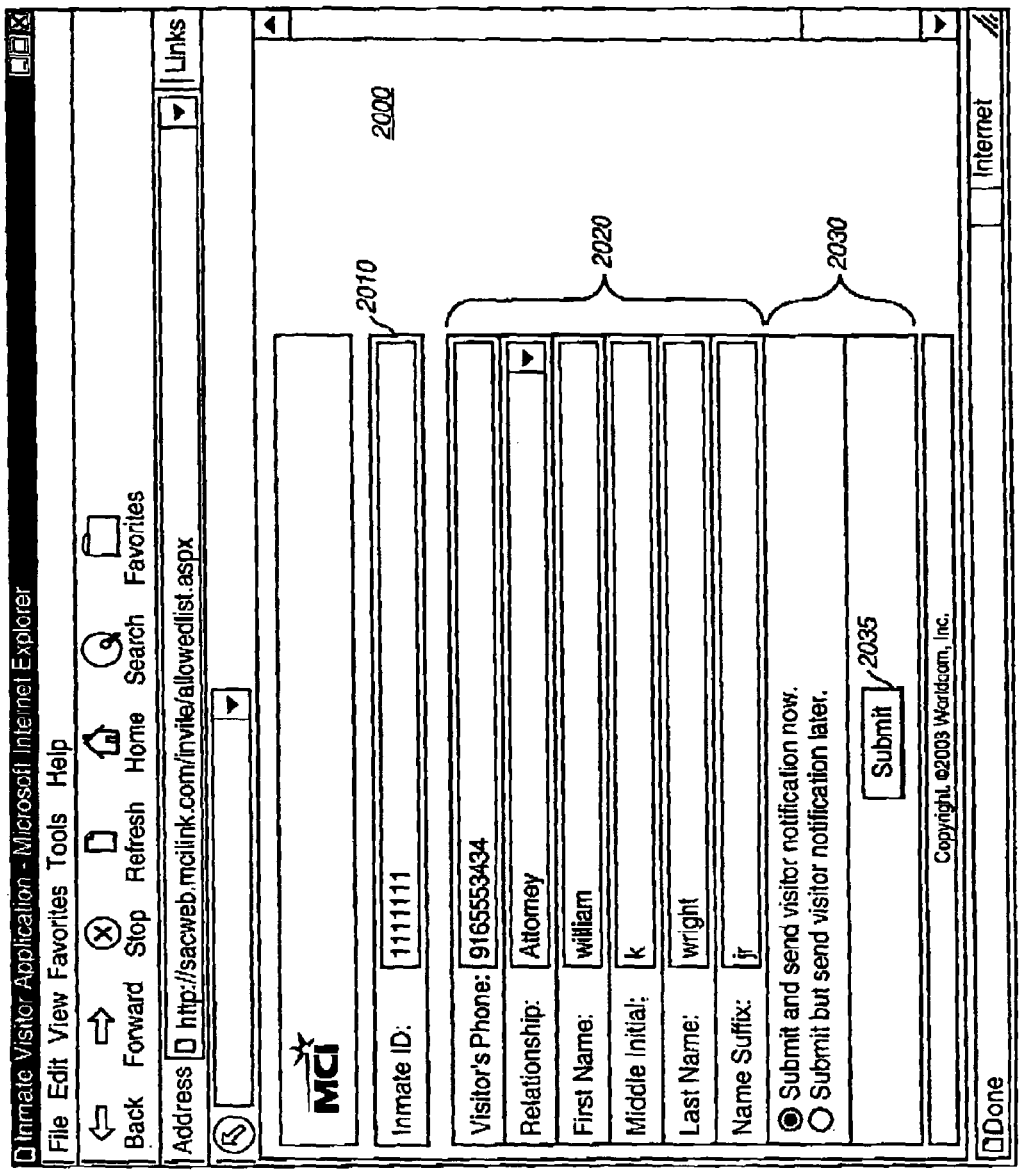

In particular, FIG. 2 illustrates an exemplary inmate visitation interface that allows an inmate to add a potential visitor to their "address book." In particular, to add a potential visitor to the inmate's "address book", the inmate, either directly or via an assistant, such as a department of corrections official, enters the inmate identifier 2010. Provided the inmate associated with the inmate identifier 2010 has visitation privileges, the visitor registration module 110 prompts the user for, for example, the information to populate visitor fields 2020. This information can include, for example, the visitor's phone, the visitors relationship to the inmate, the first name, middle initial and last name of the visitor, a name suffix (if applicable), zip code, address, social security number, legal guardian, date of birth, or the like. Alternatively, and not shown, upon entering the visitor(s) phone or other appropriate identifier, the visitor registration module 110 can pre-populate the visitor information portion 2020 based on pre-stored or previously registered visitor information. In addition, the add visitor interface 2000 provides a selectable portion 2030 that allows the visitor registration module 110 to submit and send the visitor notification immediately, or at later time.

Figure 3:
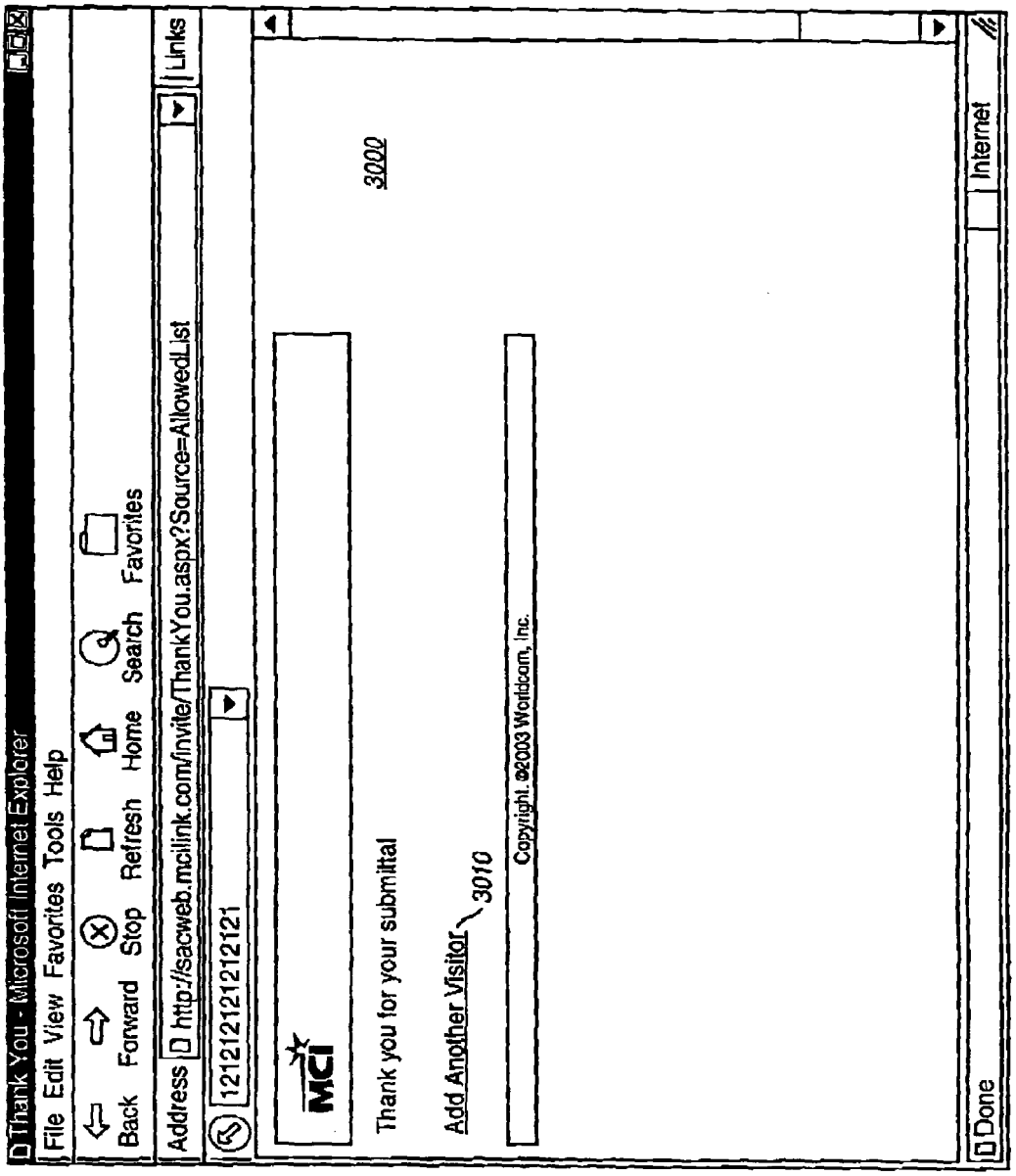

Upon selecting submit button 2035, the user entering the visitor information is provided with an exemplary thank you screen 3000, shown in FIG. 3, that allows, for example, the addition of another visitor by selecting the "add another visitor" hyperlink 3010. Upon selecting the "add another visitor" hyperlink 3010, the user is again presented with the add visitor interface 2000. Upon submitting a request to add a visitor, a registration number is generated and assigned to each potential visitor by the visitor registration module 110. This registration number can be unique within the entire department of corrections.

For example, the registration number can comprise a department of corrections identifier, a potential visitor's identifier and/or, for example, a pin number.

As discussed above, once the potential visitor's information has been entered into the visitor registration module 110, the visitor registration module 110 either instantaneously, or at a later time, notifies the potential visitor of the registration request and provides instructions to the potential visitor on how to register.

In general, and in accordance with one exemplary embodiment, a visitor must complete a one-time registration process for all inmates the visitor intends to visit now or in the future. The visitor only need register once, and does not need to register for each inmate in the department of corrections the visitor intends to visit. The registration interface 4000, illustrated in FIG. 4, allows visitors to submit registration data via the internet. However, as discussed above, it should be appreciated that the various fields and specific queries directed towards those fields can be asked and responses gathered from potential visitors by the IVR module 410. The visitors responses can then be converted into a format similar to the data received from the visitor registration interface 4000 via the web interface module 400.

Thus, for example, when the submit now button is selected, the visitor registration module 110 stores in the database 150 the entered information and a notification is immediately sent to the visitor. Alternatively, when the submit notification later button is selected, the visitor registration module 110 stores the data in the database 150 and notification scheduled for, for example, a later batch run.

In the event the potential visitor does not have access to the internet, the potential visitor can be giving instructions similar to the following example. In particular, the visitor registration module 110, cooperating with the web interface module 400 and IVR module 410 can call potential visitor and greet them with the following exemplary message:

Welcome to <xyz Department of Correction's> visitation system. <inmate's name> has requested <visitor's name> be approved as a visitor at <institution name> a correctional facility for the state of <xyz>. To complete the registration process please call toll free <1-XXX-XXXX>, or access the web site www.WEBADDREZ-Z.COM If you do not wish to be an approved visitor for <inmate name> please disregard this message or call toll free <1-XXX-XXXX> and follow the instructions to reject this request. Thank you and good bye.

While the remainder of the discussion will be directed toward a user who interfaces with the invite system 100 via a visitor interface 300 over a network, such as the Internet, it is to be appreciated that comparable interaction with the invite system 100 can be performed with the cooperation of the web interface module 400 and IVR module 410.

Upon receiving the registration request a user can access a web site, via the visitor interface 300, and communicate with the visitor registration module 110. The visitor registration module 110 can provide to the potential visitor registration interface 4000.

Along with the notification of the visitation request and instructions on how to register, the visitor registration module 110 can also provide the potential visitor with the inmate's identification number. Thus, as discussed hereinafter, in conjunction with, for example, the potential visitor's phone number and the potential visitor's relationship to the inmate, the inmate's identification number can be used to verify the inmate has requested visitation by the visitor.

Thus, upon contacting, for example, a 1-800 number, or visiting the specified web site given to the potential visitor in the visitation request, the potential visitor will be prompted to register with the visitor registration module 110. In particular, the visitor registration screen 4000 prompts the user for number of exemplary fields including, but not limited to, phone number, name, address, and the like. One or more of these fields can be compared to information originally entered by the inmate to confirm the inmate has actually asked for the potential visitor(s) submitting the registration request for a visit.

If the visitor registration module 110 determines that the inmate has not requested this particular visitor, the system can communicate to the potential visitor that it appears the inmate has not requested a visit and request them to confirm the accuracy of their registration information.

The registration interface 4000 can also be dynamic such that it can check and validate entered data to ensure the data is in the proper format and that, for example, all necessary fields are populated. Upon selecting the submit button, the visitor can receive an indication that they have completed the registration process and that their information will be reviewed by the department of corrections. Upon approval by the department of corrections, the visitor will receive a confirmation via one or more of an automated phone call, the mail, or an electronic message, the result of their registration process.

The system can optionally also provide a temporary registration number that can be used to check the status of the registration process.

Specifically, when the next button is selected in the visitation scheduling screen 7000, the inmate visitation schedule module 120 performs a check to determine if the inmate number entered is valid and if the visitation date is valid and available. The inmate visitation schedule module 120 will notify the user if the inmate number is invalid, if the date entered is invalid, or if the date entered is not available for visiting. The date could be unavailable for many reasons including, but not limiting to, the prison does not allow visits on that date, the inmate is not allowed to see visitors on that date, or the like. Furthermore, the inmate visitation schedule module 120 can determine if the inmate has reached a maximum visits allowed for that date, has the site denied visits on that date, has the site reached the maximum number of visits allowed for that date and does the inmate under visitation have restrictions in place for that date, or the like.

If the inmate number and date entered are valid, the system can generate and display the inmate's current location and the time slots available to visit that inmate as illustrated in exemplary time schedule screen 8000. In addition to the above, upon selecting the next button, the inmate visitation schedule module 120 determines whether a valid registration number has been entered, is there any registration number not on the inmate's visitation list, is there any visitor denied visitation privileges, if the time slot is still available, and can generate appropriate messages regarding any of the above items being invalid.

In addition to the above, the invite system 100 can be adapted to allow multiple visitations to an inmate within the same time slot. For example, the invite system can track the maximum number of visitors allowed to see an inmate within a given time slot. Furthermore, the invite system 100 can track a running count of the total number persons scheduled for a visit by adding a number of visitors in each visitation. Additionally, the invite system can communicate with one or more additional invite systems to share data that may include visitor information, visitation information, visitor status information, inmate status information, or the like. Likewise, the invite system is capable of generating reports that are at least capable of summarizing any aspect of the invite system including, but not limited to, visitor information, visitation information, visitation tracking information, visitation duration information, and the like. Furthermore, these reports can be used to enhance security by allowing summaries of a particular inmate's activities or visitor's activities to be produced. Similarly, profile information about a visitor such as relatives, friends, affiliations, or the like can also be used and recalled by a department of corrections official to aid in determining if visitation should be granted. Likewise, the invite system is capable of generating reports that are at least capable of summarizing any aspect of the invite system including, but not limited to, visitor information, visitation information, visitation tracking information, visitation duration information, and the like. Furthermore, these reports can be used to enhance security by allowing summaries of a particular inmate's activities or visitor's activities to be produced. Similarly, profile information about a visitor such as relatives, friends, affiliations, or the like can also be used and recalled by a department of corrections official to aid in determining if visitation should be granted.

Furthermore, and not illustrated, potential visitors can check the status of their registrations, via, for example, a web interface, at which the potential visitor enters an inmate ID number, the visitor's phone number and, for example, a temporary registration number. The visitor registration module 110 can then provide the status of the registration request to the visitor.

Figure 5:
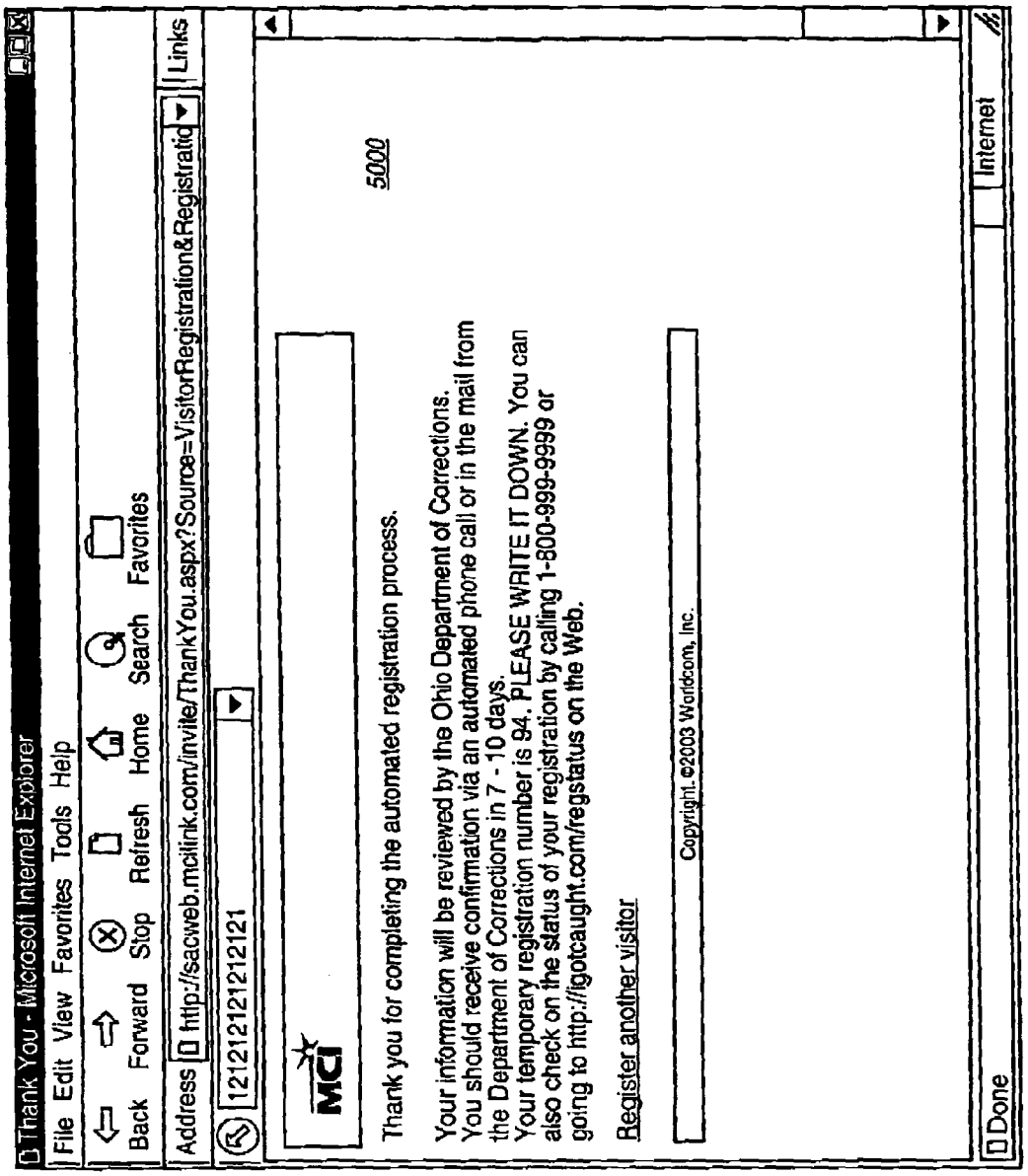

The registration process confirmation screen 5000, shown in FIG. 5, informs the potential visitor that the registration process is complete and provides information regarding temporary registration numbers and the like.

Figure 6:
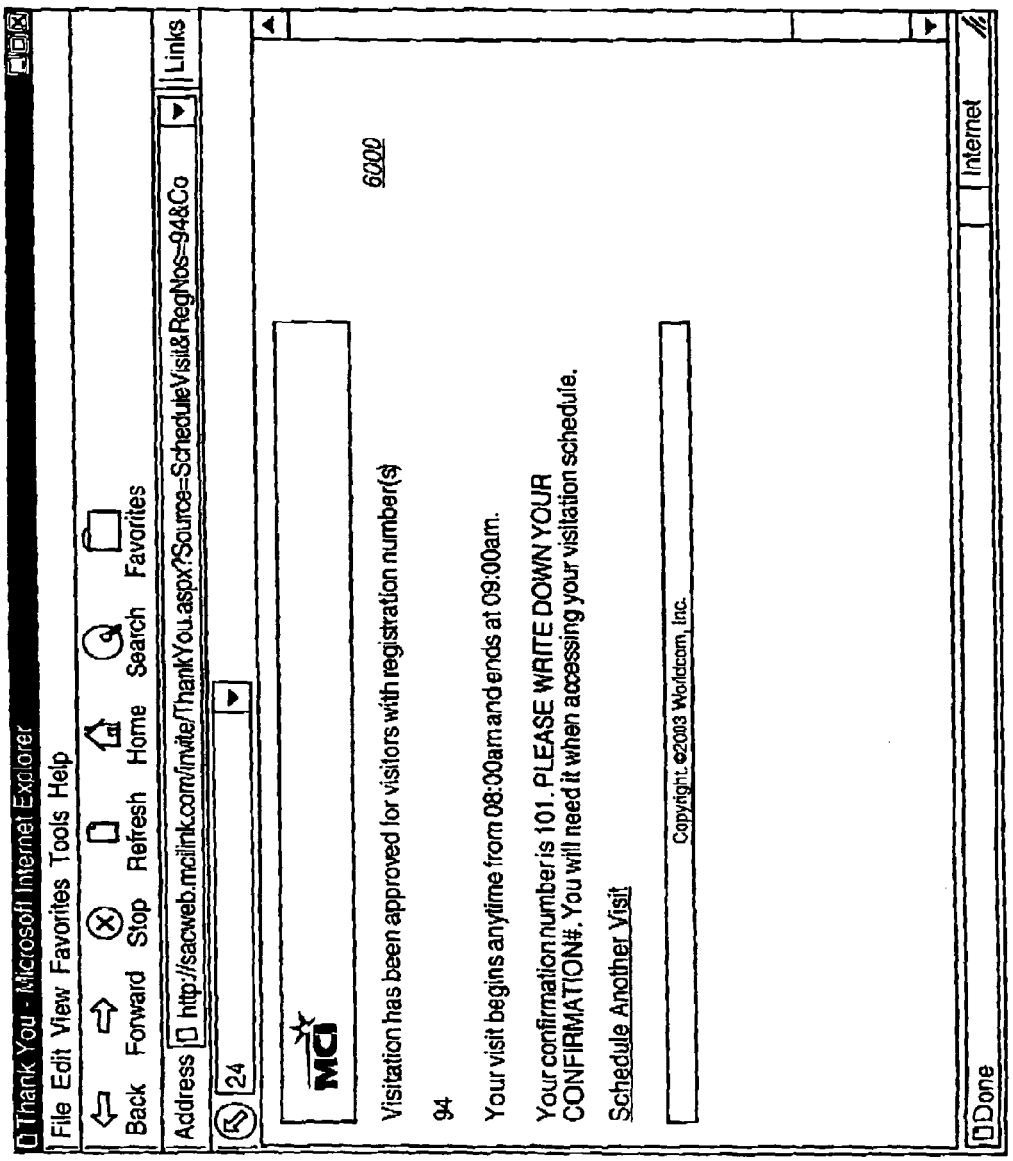
Figure 7:
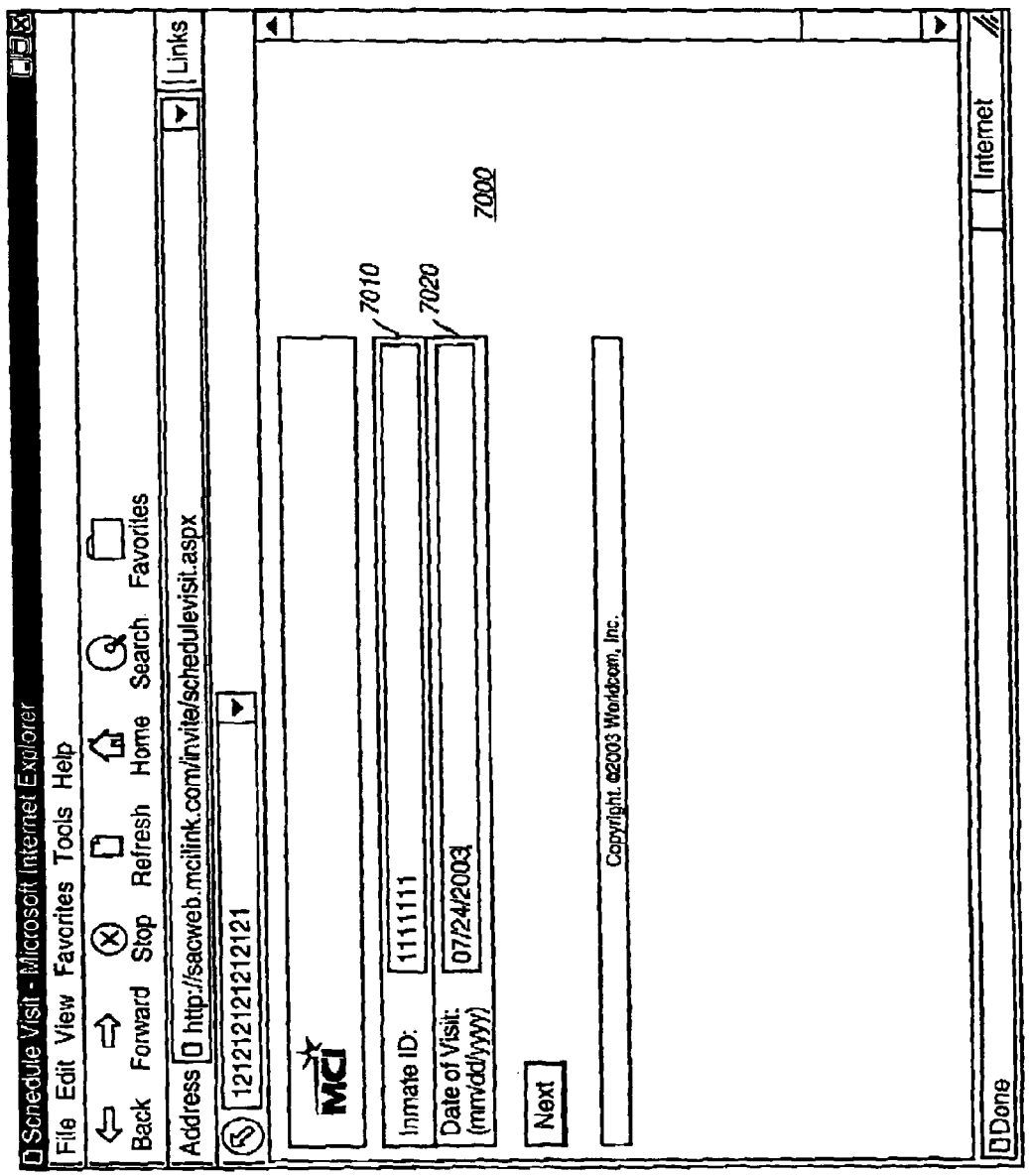
Figure 8:
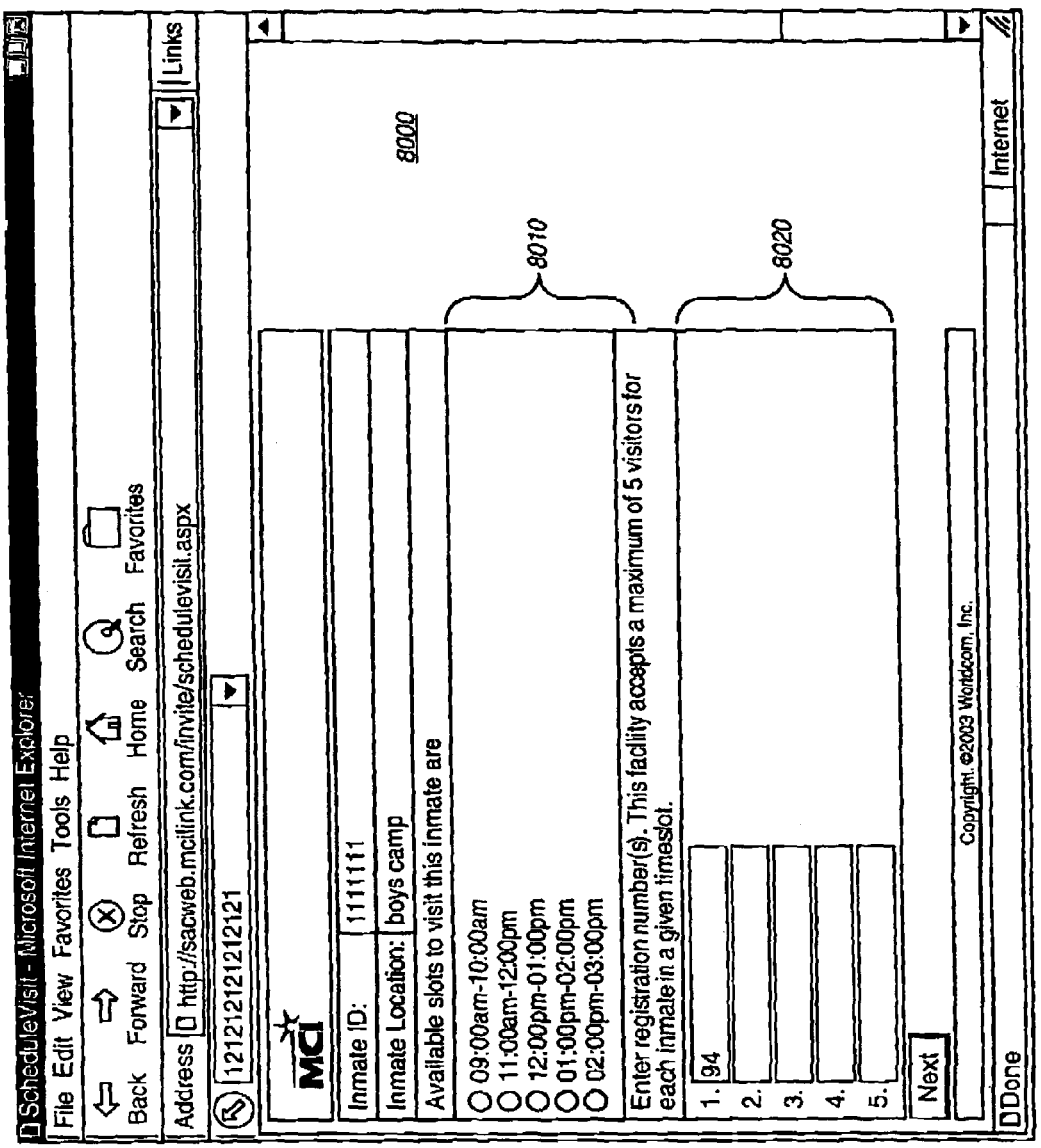

Upon completing the registration process, the visitor registration module 110, and optionally in cooperation with, for example, a department of corrections official, determines whether the registration was approved, denied, or whether additional information is required. For example, the approval screen 6000, shown in FIG. 6, illustrates an exemplary interface that can be provided to a user upon successful completion of registration. Thus, for example, the potential visitor is presented with a registration number and a confirmation number. Additionally, the confirmation screen 6000 can provide the ability for the potential visitor to schedule another visit to the same or a different inmate.

In order to schedule a visit to an inmate, and for an approved registration, the visitor must be registered as a visitor on the inmate's visitor list. A registered visitor will have a registration number assigned to them. A visitor can schedule one or more visits at a time and the schedule may include more than one visitor, each visitor having a valid registration number for that particular visit. Then, for example, when scheduling the visit, the visitor will enter the registration number for each visitor that will accompany them during the visit. Upon successful entry and validation of this information, the visitor will be issued a visitation confirmation number.

In particular, upon receiving the registration number and confirmation number, the visitor can either proceed to, for example, a web site or dial a specific telephone number. Regardless of which communications procedure is used to schedule the visit, the visitor selects the option to schedule a visit. For example, as illustrated in visitation scheduling screen 7000, shown in FIG. 7, the visitor enters the inmate identification 7010 and the proposed date of visit 7020. Upon selecting the next button, the inmate visitation schedule module 120 determines and generates an interface or plays a message that contains the inmate's location and available visitation time slot as illustrated in exemplary time schedule interface 8000, shown in FIG. 8. The visitor then selects, via a click of a mouse or through use of the keypad, the desired time slot 8010 for the visit and then enters the registration number associated with each visitor 8020. Upon selecting the "next" button, the inmate visitation schedule 120 validates the data and issues to the visitor a confirmation "ticket" as discussed above which can include, for example, summary information about the visit, directions and instructions on what to do when arriving at the prison, reference numbers, and the like. Thus, as discussed above, the invite system 100 can scan this ticket upon arrival of the visitor at the prison to facilitate, for example, check in.

Figure 9:
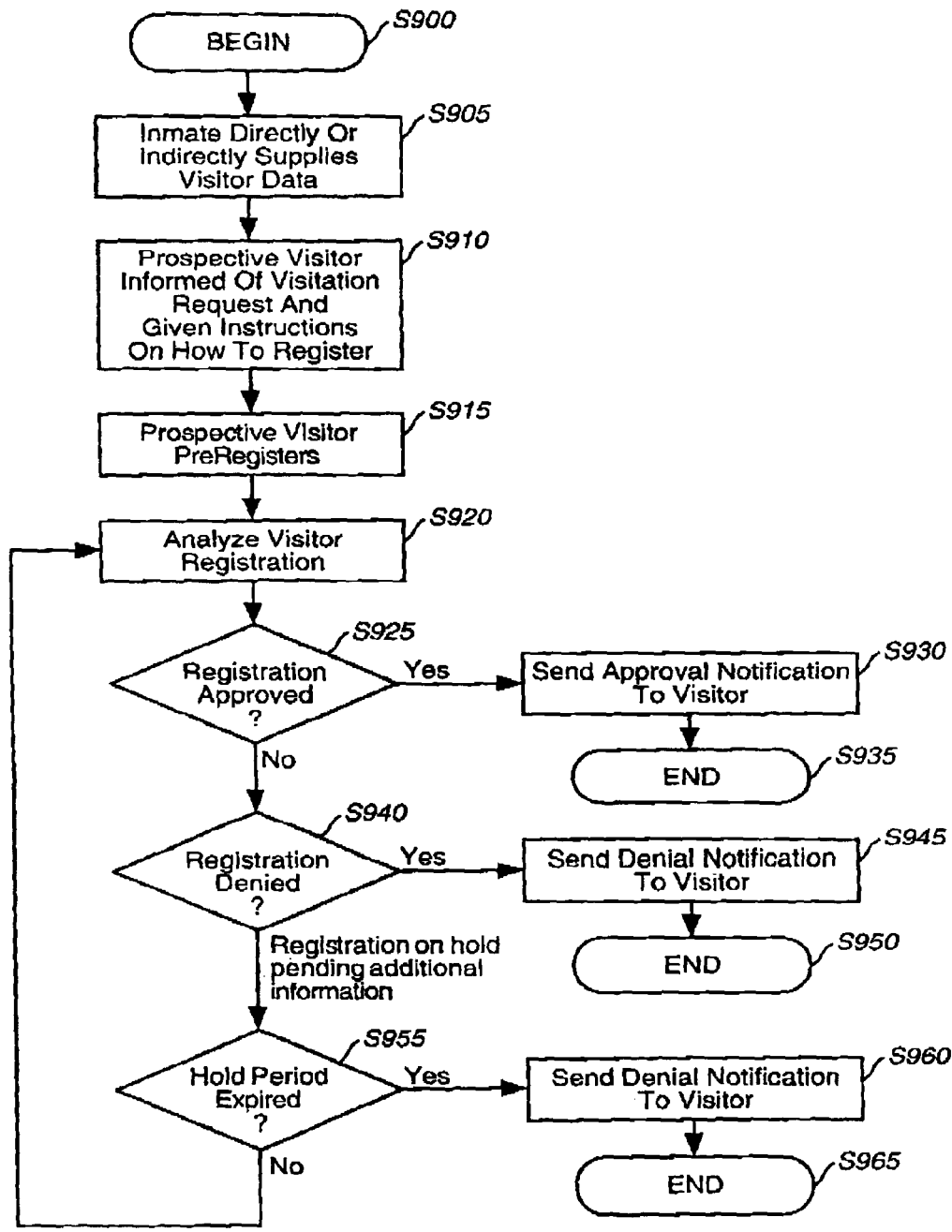
FIG. 9 is a flowchart illustrating a visitor registration process.

FIG. 9 illustrates an exemplary method of a potential visitor pre-registering with the invite system. In particular, control begins in step S900 and continues to step S905. In step S905, the inmate directly or indirectly supplies visitor(s) data. Next, in step S910, the prospective visitor is informed of the visitation request and given instructions on how to register. Then, in step S915, the potential visitor pre-registers. Control then continues to step S920.

In step S920, the visitor registration is analyzed for the number of determinations made. In particular, in step S925, a determination is made whether the registration is approved. If the registration is approved, an approval notification is sent to the visitor in step S930 and the control sequence ends in step S935.

Alternatively, if the registration is denied in step S940, control continues to step S945 or a denial notification is forwarded to the visitor and control continue to step S950 where the control sequence ends.

Alternatively still, the registration can be held pending additional information and control continues to step S955 where a determination is made whether the hold period has expired. If the hold period has expired, control continues to step S960 where a denial notification is forwarded to the visitor. Alternatively, control jumps back to step S920.

Figure 10:
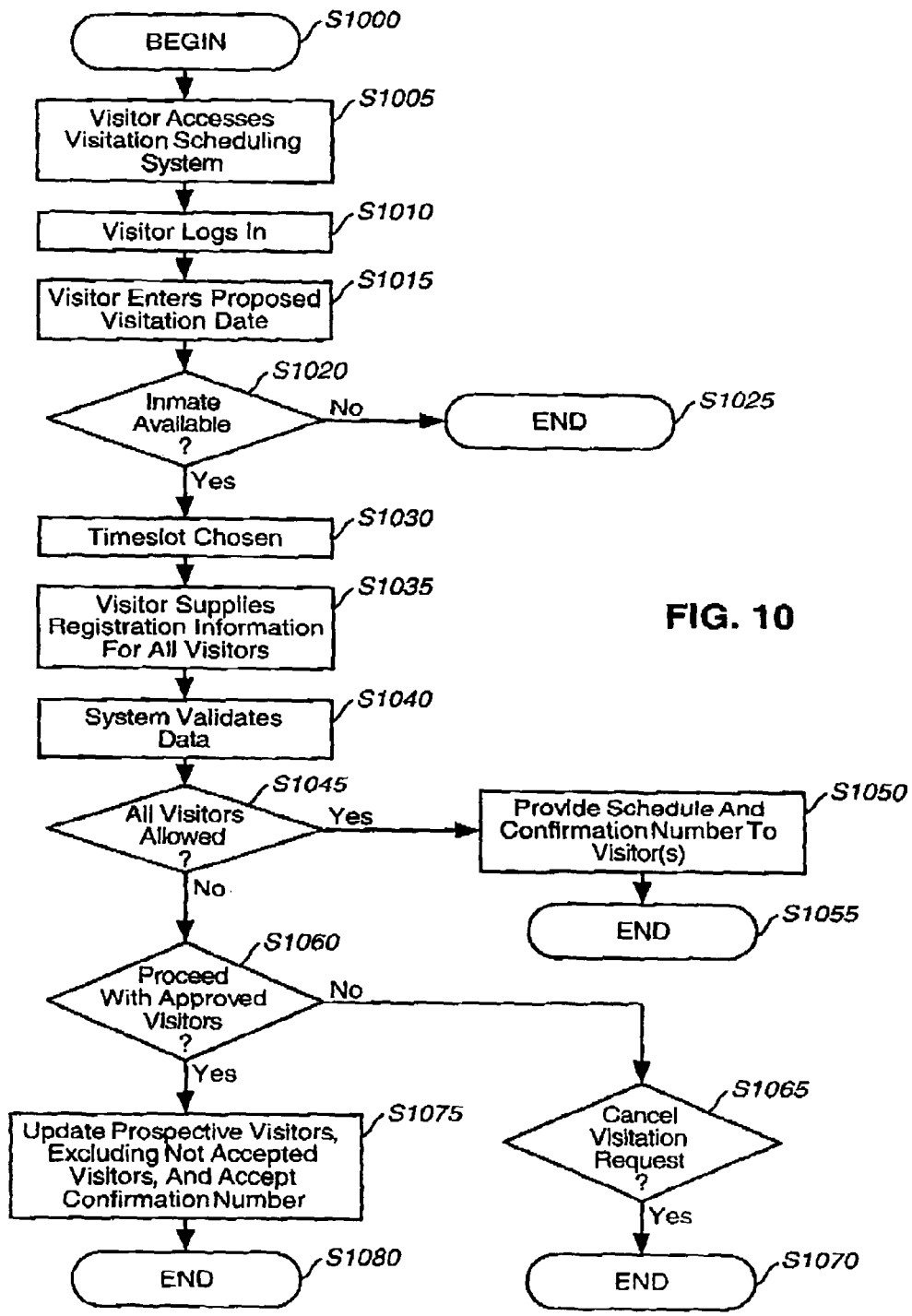
FIG. 10 is a flowchart illustrating an exemplary method of scheduling a visit.

FIG. 10 outlines an exemplary method of scheduling a visit. In particular, control begins in step S1000 and continues to step S1005. In step S1005, the visitor access a visitation scheduling system and logs-in in step S1010. Next, in step S1015, the visitor enters the proposed visitation date. Then, in step S1020, a determination is made whether the inmate is available. If the inmate is not available, control continues to step S1025 where the control sequence ends. Otherwise, control continues to step S1030 where an available time slot is chosen. Then control continues to step S1035. In step S1035, the visitor(s) supplies registration information for all visitors. Next, in step S1040, the entered data is validated and control continues to step S1045 where a determination is made whether all visitors are allowed to visit the selected inmate. If all visitors are allowed to visit the selected inmate, control continues to step S1050 where a scheduling confirmation number is provided to the visitor(s). Control then continues to step S1055 where the control sequence ends.

Alternatively, if a portion of the visitors are not allowed, control jumps to step S1060 where a determination is made to proceed with the approved visitors. If the visitation proceeds with the approved visitors, control continues to step S1075 where the visitor has the option of updating the potential visitors, canceling the non-accepted visitors, and accepting a confirmation number. Control then continues to step S1080.

Otherwise, control continues to step S11065 where the visitation request is cancelled and control continues to step S1070 where the control sequence ends.

Figure 11:
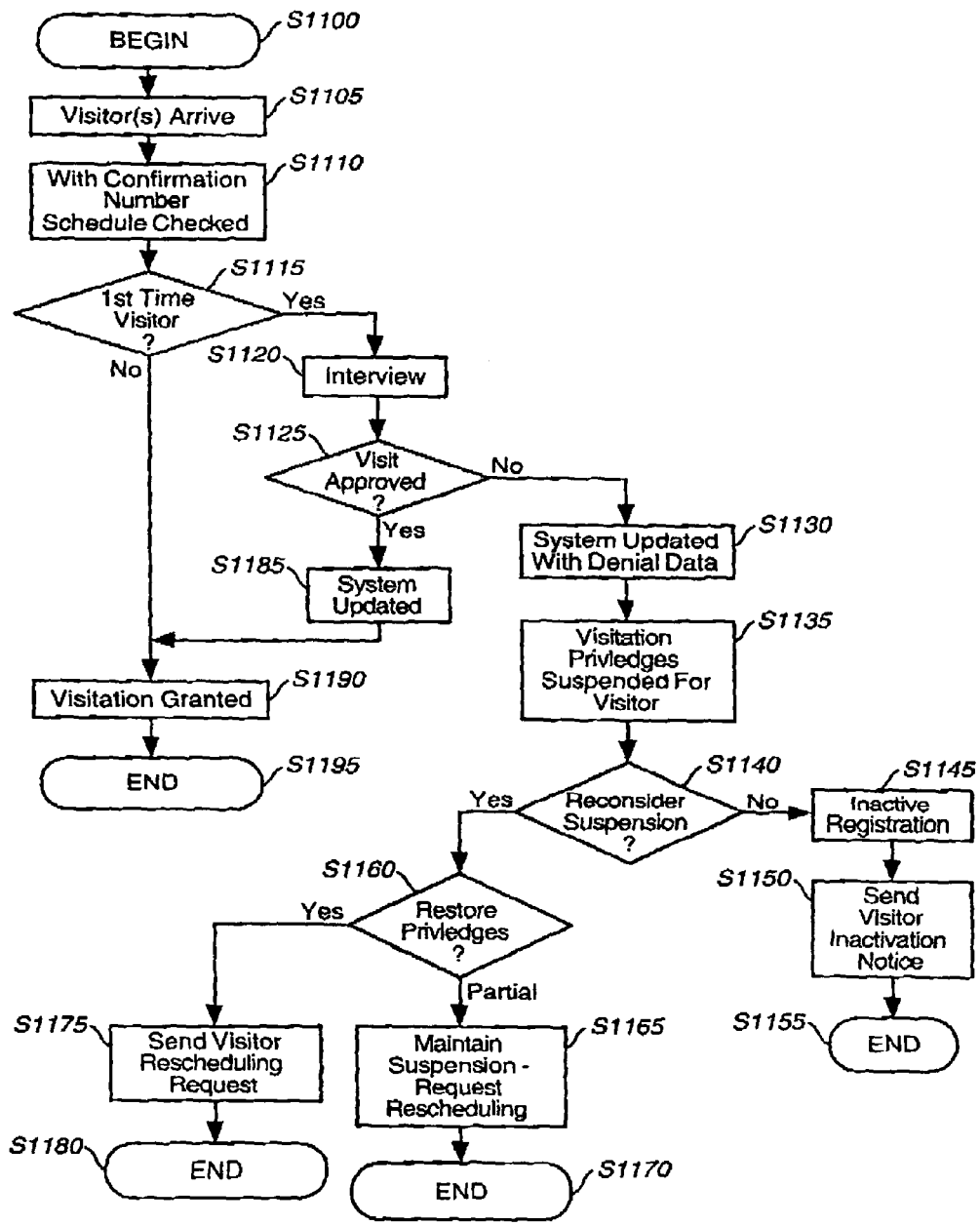
FIG. 11 is a flowchart illustrating an exemplary method of approving a visit.

FIG. 11 outlines an exemplary method of the actual visitation process according to this invention.

In particular, control begins in step S1100 and continues to Step S1105. In step S1105, the visitor(s) arrive and in step S1110 the visitors check-in, for example, using the "ticket" received upon completion of the registration. Next, in step S1115, a determination is made if one or more of the visitors are a first time visitor. If one or more of the visitors are a first time visitor control continues to step S1120 where a visit interview is performed. Next, in step S1125, if the visit interview is acceptable, a department of corrections official updates the visitor database in step S1185 and control continues to step S1190.

Otherwise, if the results of the visit interview is negative, control continues to step S1130 where the system is updated with the visitation denial data. Then, in step S1135, the visitation privileges for that particular visitor are suspended for a predetermined or indefinite period of time.

In step S1140, a determination is made whether to reconsider suspended visitation privileges. If the suspension is not reconsidered, control continues to step S1145 where the visitation registration is inactivated and in step S1150 a notification of inactivation is sent to the visitor. Control then continues to step S1155 where the control sequence ends.

If the suspension is to be reconsidered, control continues to step S1160 where a determination is made whether to restore privileges to the suspended visitor. If privileges are to be restored, control continues to step S1175 where the visitor is sent a rescheduling request and control continues to step S1180 where the control sequence ends. Alternatively, for partial reinstatement of visitor privileges control continues to step S1165 where the suspension is maintained, yet a rescheduling request is sent to the visitor to schedule another interview. Control then continues to step S1170 where the control sequence ends.

If the visitor is not a first time visitor, and assuming the visitation privileges for that visitor have not been suspended, control jumps to step S1190 where the visitation is granted and control continues to Step S1195 where the control sequence ends.

As illustrated in the figures, the inmate visitor scheduling tool can be implemented either on a single programmed general purpose computer, a separate programmed general purpose computer, or a combination thereof. However, the inmate visitor scheduling tool can also be implemented on a special purpose computer, a programmed microprocessor or microcontroller and peripheral integrated circuit element, an ASIC, or other integrated circuit, a digital signal processor, a hard-wired electronic or logic circuit, such as discrete element circuit, a programmable logic device, such as a PLD, PLA, FPGA, PAL or the like. In general, any device capable of implementing a state machine that is in turn capable of implementing the flowcharts illustrated herein can be used to implement the inmate visitor scheduling tool according to this invention.

Furthermore, the disclosed method may be readily implemented in software using an object or object-oriented software development environment that provides source code that can be used on a variety of computer, server, or workstation hardware platforms. Alternatively, the disclosed inmate visitor scheduling tool may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. The inmate visitor scheduling tool however, can be readily implemented in hardware and/or software using any known or later developed systems or structures, devices and/or software by those of ordinary skill in the applicable art from the functional description provided herein, and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded in a telecommunications system, such as JAVA® or CGI script, as a resource residing on a server or graphics workstation, as a routine embedded on a dedicated inmate visitor scheduling system, or the like. The inmate visitor scheduling tool can also be implemented by physically incorporating the system into a software and/or hardware systems such as the hardware and software system of a server and associated interface device.

It is, therefore, apparent that there has been provided, in accordance with the present invention, an inmate visitor scheduling tool. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within the spirit and scope of this invention.

The invention claimed is:

1. An inmate visitation system, comprising:
   means for determining via a prison interface if the inmate has visitation privileges and, if not, then not allowing any visitation;
   means for receiving a visitation request only from an inmate having said visitation privileges for a plurality of potential visitors to attend the same visitation with said inmate at a correctional facility in which said inmate is housed, each of said potential visitors being named in said request by said privileged inmate;
   means for sending a registration request to each of the plurality of potential visitors based upon the received visitation request;
   means for receiving registration information from said each of said plurality of potential visitors based upon the sent registration request;
   means, responsive to operation of said registration information receiving means, for determining whether the visitation request for said each of said plurality of potential visitors from the privileged inmate is approved or disapproved;
   means for communicating the approval or disapproval of the visitation request for said each of said plurality of potential visitors; and
   means, operative in response to said registration receiving means, for permitting one of said plurality of said potential visitors to schedule said same visitation for all of said plurality of potential visitors if said visitation request is approved for said all of said potential visitors and for permitting said one of said plurality of said potential visitors to make a decision selected from the group of decisions consisting of allowing said visitation and canceling said visitation if said visitation request is not approved for said all of said potential visitors.

2. The system of claim 1, further comprising:
   means for recording information associated with one or more of the visitation request, the registration request and the visitation approval or disapproval.

3. The system of claim 1, wherein the means for determining is at least one of a prison official and an analytical process that reviews at least one of historical visitation requests and visitation data.

4. The system of claim 2, wherein the means for recording further maintains a history of potential visitors including the plurality of potential visitors requested by the privileged inmate.

5. The system of claim 1, wherein the visitation request includes at least one of a name, address, telephone number and relationship to the privileged inmate of at least one of the plurality of potential visitors.

6. The system of claim 1, further comprising:
   means for scheduling, for approved ones of the potential visitors, an available time to visit the privileged inmate.

7. A method for registering potential visitors of incarcerated inmates, comprising:
   determining, via a prison interface, if any of the incarcerated inmates have visitation privileges and, if not, then not allowing any visitation;
   receiving, via operational performance of a computer, a visitation request from a privileged inmate for a plurality of potential visitors to attend the same visitation with said privileged inmate within a correctional facility in which said privileged inmate is incarcerated, each of said potential visitors being named in said request by said inmate;
   sending, via operational performance of said computer, a registration request to each of the plurality of potential visitors based upon the received visitation request;
   receiving, via operational performance of said computer, registration information from said each of said plurality of potential visitors based upon the sent registration request;
   determining, as a function of said registration information, whether the visitation request for said each of said plurality of potential visitors from the inmate is approved or disapproved;
   communicating, via operational performance of said computer, the approval or disapproval of the visitation request for said each of said plurality of potential visitors; and
   permitting, via operational performance of said computer, one of said plurality of said potential visitors to schedule said same visitation for all of said plurality of potential visitors if said visitation request is approved for said all of said potential visitors and for permitting said one of said plurality of said potential visitors to make a decision selected from the group of decisions consisting of allowing said visitation and canceling said visitation if said visitation request is not approved for said all of said potential visitors.

8. The method of claim 7, further comprising:
   recording information associated with one or more of the visitation request, the registration request and the visitation approval or disapproval.

9. The method of claim 7, wherein the determining is at least one of a manual and an automated process that reviews at least one of historical visitation requests and visitation data.

10. The method of claim 8, wherein recording further comprises maintaining a history of potential visitors including the plurality of potential visitors requested by the inmate.

11. The method of claim 7, wherein the visitation request includes at least one of a name, address, telephone number and relationship to the inmate of at least one of the plurality of potential visitors.

12. The method of claim 7, further comprising:
   scheduling, for approved ones of the potential visitors, an available time to visit the inmate.

13. A tangible computer program product including computer-readable program code for use in a computer, said computer readable program code comprising:
   visitation registration program code executable on said computer only for visitation requests made via a prison interface by inmates having visitation privileges and if there are no said privileges then not executing said program code and not allowing any visitation, said visitation registration program code for
   receiving a visitation request from a privileged inmate for a plurality of potential visitors to attend the same visitation with said privileged inmate at a prison in which said privileged inmate is incarcerated, each of said potential visitors being named in said request by said inmate;
   automatically approving or disapproving a registration request for each of the plurality of potential visitors, the registration request sent to each of the plurality of potential visitors based upon the visitation request; and
   recording information associated with at least one of the visitation request and the registration request; and visitation scheduling program code for permitting an approved one of said plurality of said potential visitors to schedule an available time for all approved ones of said plurality of potential visitors to visit said inmate at said same visitation and for permitting said approved one of said plurality of potential visitors to make a decision selected from the group of decisions consisting of allowing said visitation and canceling said visitation if said all approved ones of said plurality of potential visitors is not equal to said plurality of potential visitors.

14. The computer program product of claim 13, wherein the visitation scheduling program code is accessed by an approved potential visitor.

15. The computer program product of claim 13, wherein the visitation registration program code further comprises communicating disapproval of the registration request in response to the registration request.

16. The computer program product of claim 13, wherein the visitation registration program code further allows the plurality of potential visitors to access a status of the registration request.

17. The computer program product of claim 13, wherein if additional information is needed the visitation registration program code further places the registration request on hold pending the additional information.

18. An automated method to register and schedule a plurality of potential visitors in a given timeslot for a visit with an inmate, the method comprising:
- determining, via a prison interface, if the inmate has visitation privileges and, if not, then not allowing any visitation;
- receiving, by operational performance of a computer, names of the plurality of potential visitors from a privileged inmate along with a request to provide registration information of all said potential visitors in order to schedule the visit between said all said potential visitors with the privileged inmate at a prison in which said inmate is incarcerated;
- forwarding, via operational performance of said computer, said request to each of the plurality of potential visitors;
- said each potential visitor, via operational performance of said computer, supplying its own requested registration information to a sender of the request;
- receiving, via operational performance of said computer, an approval notification for at least one of the plurality of potential visitors to attend said visit;
- one of said at least one of the plurality of potential visitors, via operational performance of said computer, accessing a visitation schedule to enter a proposed visiting time corresponding to the given timeslot to schedule the visit for all said at least one of the plurality of potential visitors with the privileged inmate provided that said all said potential visitors is no fewer than said plurality of said potential visitors and, if not, said one potential visitor making a decision selected from the group of decisions consisting of allowing said accessing and disallowing said accessing;
- determining, via operational performance of said computer, whether the privileged inmate is available at the proposed visiting time; and
- if the privileged inmate is available during the proposed visiting time, receiving, via operational performance of said computer, a schedule and confirmation number provided that said decision is not said disallowing said accessing.

19. The method of claim 18, wherein the request is based upon a visitation request supplied by the privileged inmate.

20. A computer implemented process comprising:
(a) determining, via a prison interface, if an inmate has visitation privileges and, if not, then not allowing any visitation, but if so, continuing with steps (b) through (g);
(b) said privileged inmate providing names and contact information of a plurality of potential visitors to an inmate-visitation, said names and contact information being provided as an input to a computer, thereby obtaining a visitation request;
(c) sending, by operational performance of said computer, a registration request to each of said named potential visitors to obtain information about said each of said named potential visitors;
(d) said each of said named potential visitors responding to said registration request, by operational performance of said computer, by providing said information about itself;
(e) at least one of said named potential visitors receiving, by operational performance of said computer, a registration number uniquely identifying said at least one of said named potential visitors;
(f) one of said at least one of said named potential visitors proposing, by operational performance of said computer, a date and time for said inmate-visitation at a correctional facility in which said inmate is housed for each of said named potential visitors who received a registration number provided that all said each potential visitor receiving a registration number is the same as said plurality of potential visitors and, if not, said one potential visitor making a decision selected from the group of decisions consisting of allowing said visitation and canceling said visitation; and
(g) providing said canceling said visitation is not selected, deciding if any of said named potential visitors who received a registration number shall be disallowed to attend said visitation and communicating, by operational performance of said computer, said decision to all said named potential visitors having registration numbers.

* * * * *